INVENTORS:
George Agins,
Edmund D. Gittens,
BY
ATTORNEYS

Patented June 13, 1950

2,511,614

UNITED STATES PATENT OFFICE 2,511,614

STABILIZING MECHANISM

George Agins, Brooklyn, N. Y., and Edmund D. Gittens, Roselle, N. J., assignors to Arma Corporation, Brooklyn, N. Y., a corporation of New York Application July 10, 1945, Serial No. 604,156

18 Claims. (Cl. 318—19)

This invention relates to stabilizing mechanism, and has particular reference to mechanism for stabilizing ordnance instruments mounted on unstable supports such as ships, aircraft, tanks, and the like.

At the present time, such instruments are stabilized with deck angles measured by a stable element at a chosen point on the ship or other support. These angles are, therefore, a compromise in that they are correct only for the particular orientation of the stable element and incorrect for the position of any telescope or gun at any other orientation, as is well understood in gun fire control engineering. There has been a real need for a system where each individual instrument is stabilized in the particular planes of its own gimbal trunnions with the resultant accurate trunnion tilt correction.

In accordance with the present invention, a stabilizing mechanism is provided which develops the aforementioned desirable mathematically accurate deck angle or trunnion tilt correction for a multiplicity of separate instruments, from a single deck angle measuring device, which gives out a set of functions of those angles in a peculiar combination in conjunction with a rotation of planes which will be hereinafter explained in detail.

The invention comprises stable means rotating about an axis perpendicular to the ship deck or other unstable support or platform, for measuring the deviation of each subject instrument in more than one plane, calculating mechanism for determining the trigonometric functions of the planar deviation angles so measured, a second calculating mechanism for each instrument receiving said trigonometric angle functions, the measuring plane rotation of said stable means and the individual orientation angle thereof, for calculating deviation angles in the plane of said orientation and in a plane at an angle thereto about an axis of each instrument, and means for applying the calculated angles developed by said second mechanism to the corresponding instruments for stabilizing the same.

Figure 1:
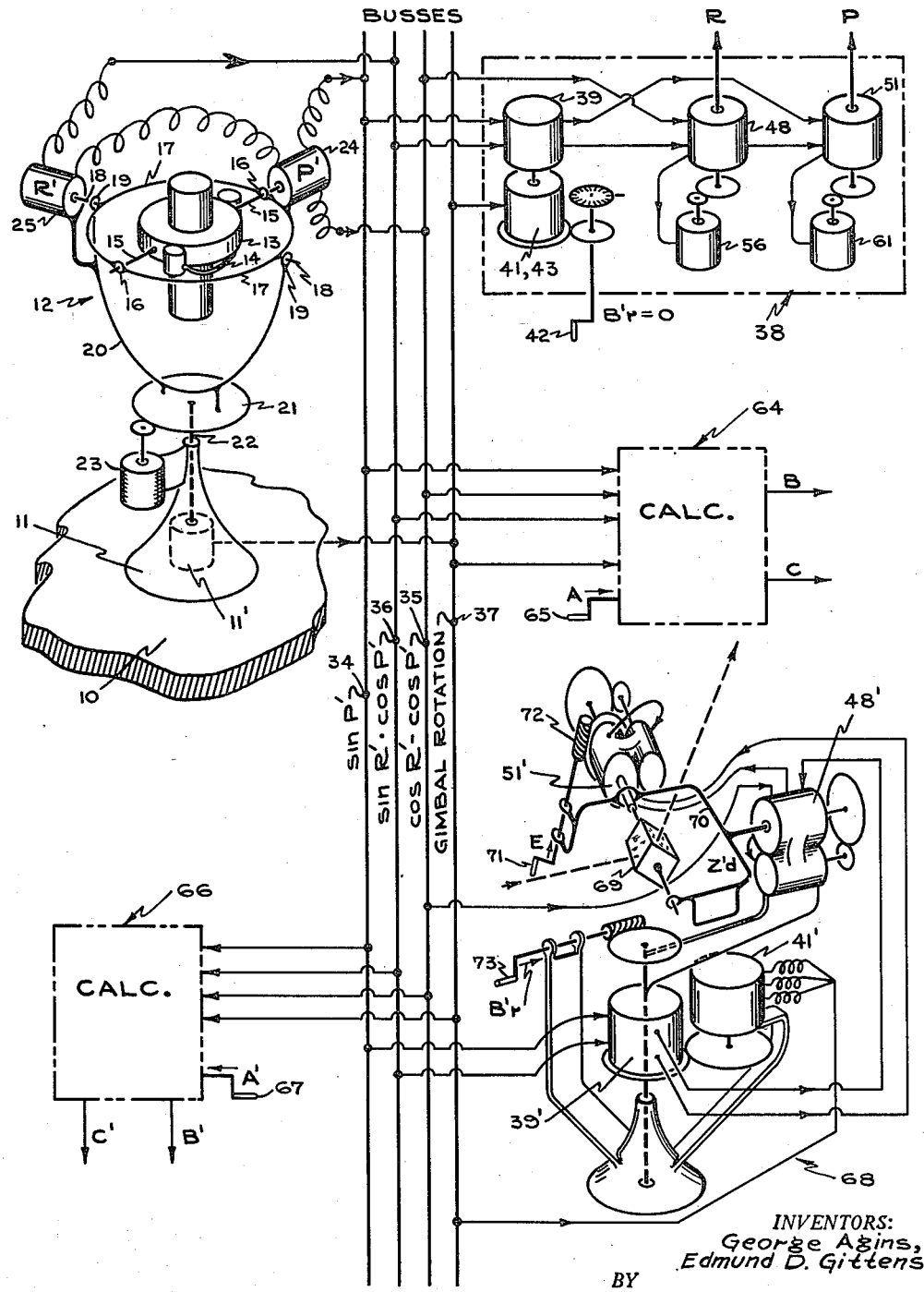
Figure 2:
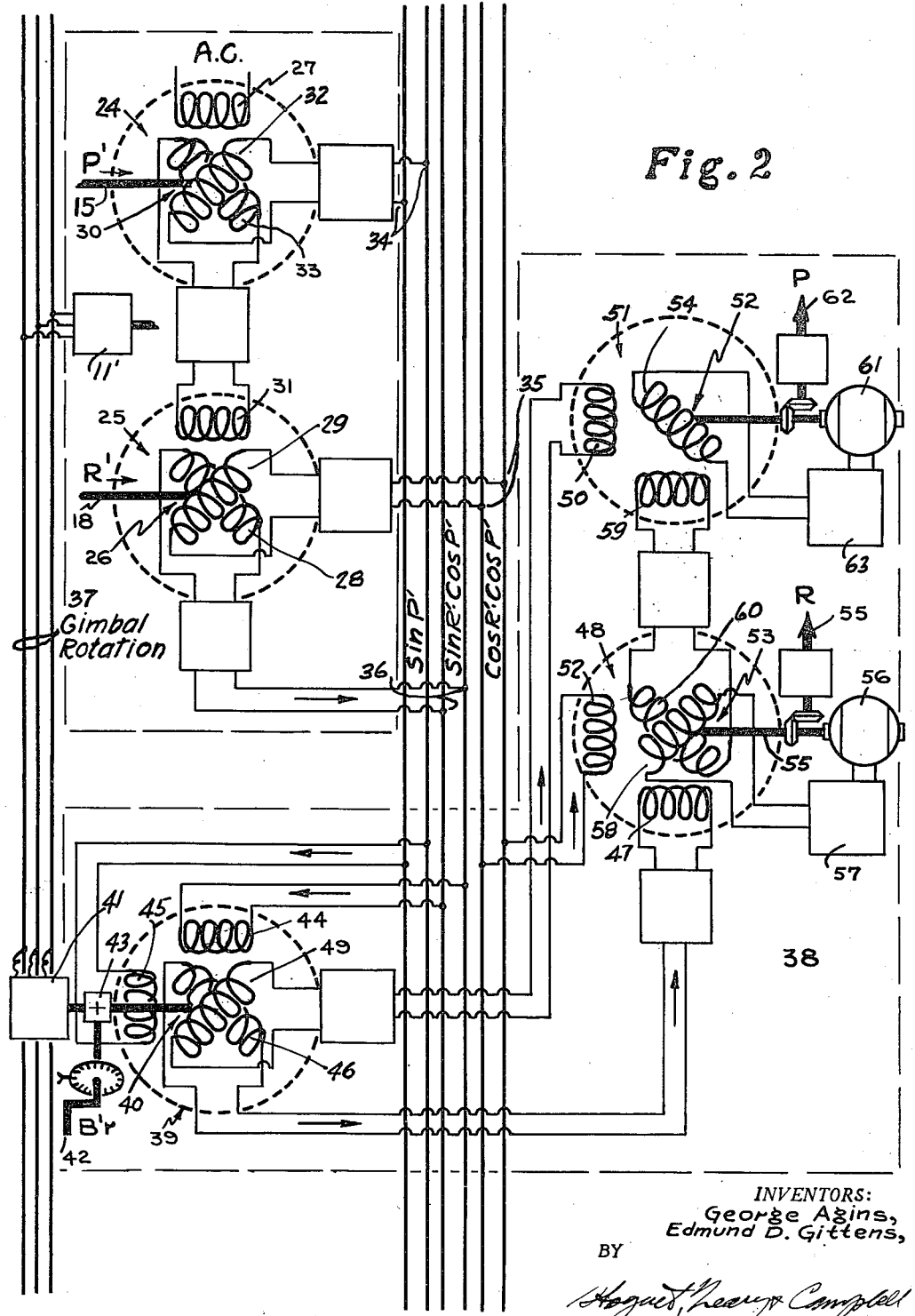

For a more complete understanding of the invention, reference may be had to the accompanying drawings, in which:

Figure 1 is a schematic diagram of the stabilizing mechanism of this invention; and, Fig. 2 is an electrical wiring diagram of one form of calculator shown in Fig. 1.

Referring to Fig. 1, numeral 10 designates the deck of a ship or tank or airplane upon which is mounted the pedestal 11 rotatably carrying a gyroscope mechanism 12. Gyroscope mechanism 12 is more or less conventional and comprises an encased vertical-axis gyroscope 13 carrying the mercury ballistic erecting system 14 and supported on trunnions 15 in sensitive bearings 16 carried by gimbal ring 17. Gimbal ring 17 is in turn supported on trunnions 18 in sensitive bearings 19 carried by a fork 20 mounted on a large gear 21 supported on upright shaft 22 journalled on pedestal 11. Gear 21, and the entire gyroscope mechanism 12 carried thereby, is continuously rotated by motor 23 about the vertical axis of shaft 22 in order to render the mercury erecting system 14 effective for its purpose. A self-synchronous transmitter 11' is driven by shaft 22 for a purpose to be described.

Applied to the more or less conventional gyroscope mechanism just described are devices for continuously measuring and transmitting trigonometric functions of the constantly changing angles to the horizontal of predetermined points on the deck 10. These devices are electromechanical resolvers 24 and 25 mounted on gimbal ring 17 and fork 20, respectively, their respective rotors being connected to one gyroscope trunnion 15 and one gimbal ring trunnion 18, as shown in Fig. 1. The particular construction of resolvers 24 and 25 forms no part of the present invention and hence they may be illustrated schematically, as in Fig. 2.

As the deck 10 moves angularly, the gyroscope trunnion 15 and the connected rotor of resolver 24 oscillate proportionally relatively to the stator and gimbal trunnion 18, and the connected rotor of resolver 25 also oscillates proportionally. Although the whole gyroscope system 12 is rotated by motor 23, assume that the relative movements between the rotor and stator of resolver 24 are designated pitch, P', and those of the resolver 25 are designated roll, R'.

Referring to Fig. 2, trunnion 15 rotates the space quadrature wound rotor 30 of resolver 24 through the pitch angle, P'. The stator winding 27 is energized from a source of steady alternating current and thus creates a pulsating flux field in which the rotor 30 rotates. Accordingly, there is induced in winding 32 of rotor 30 a voltage proportional to sin P' and in the other rotor winding 33 a voltage proportional to cos P'. Similarly, as rotor 26 of resolver 25 is positioned at angle R' by trunnion 18 and its stator winding 31 energized from the rotor output coil 33, there is induced in winding 28 of rotor 26 a voltage proportional to $\cos P' \cdot \sin R'$ and in rotor winding 29 a voltage proportional to $\cos P' \cdot \cos R'$.

The gyroscope 13 is kept vertical by erecting action of the mercury system 14 and therefore the resolvers 24 and 25 are continuously measuring the angles to the horizontal of the swinging deck 10 in planes at right angles to each other, which planes are themselves rotating about an axis 22 perpendicular to the deck 10. By this arrangement, values are produced in the resolvers 24 and 25 directly from the gimbal system, relative to every possible pair of reference planes of level and cross-level which could be required at any point on the ship to stabilize an instrument mounted there. Inasmuch as only momentary values of any particular pair of stabilizing angles are thus given, calculation is required at each station where stabilization is used.

As indicated in Fig. 1, a series of bus bars may conveniently transmit these values to remote points of the ship and may be tapped at any point to take off the desired values. However, the values as given out by the stable element 12 are not directly usable and are therefore mathematically modified at each station by computers to be described. As has been stated, the angle values in general, are not fed out of the stable unit 12, but rather certain functions of the deck angles of the form, $\sin P'$, $\sin R' \cdot \cos P'$, and $\cos R' \cdot \cos P'$, and the rotation constant from self-synchronous transmitter 11' which is a pure angle. By transmitting these functions rather than the angles themselves, the individual calculators for the instrument to be stabilized are rendered much simpler than would be the case if they used the angles themselves. Consequently greater accuracy results, because of the elimination of many steps of conversion.

Thus, bus bar 34 carries the $\sin P'$ voltage developed in winding 32 of rotor 30 and indicated in Fig. 2 across terminals 34. Bus bar 35 carries the product of the $\cos R'$ voltage induced in rotor winding 29 of resolver 25 and the $\cos P'$ voltage induced in rotor winding 33 of resolver 24, and indicated in Fig. 2 across terminals 35. Bus bar 36 carries the product of the $\sin R'$ voltage induced in rotor winding 28 of resolver 25 and the $\cos P'$ voltage induced in the rotor winding 33 of resolver 24, and indicated in Fig. 2 across the terminals 36. Bus bar 37 carries the constant rotation voltage from transmitter 11', and indicated in Fig. 2 across terminals 37.

One form of the aforementioned remote calculator for an individual instrument stabilized by utilizing the functions of the measured unstable angles carried by bus bars 34—37 is designated in Figs. 1 and 2. As shown in Fig. 2, it includes an induction resolver 39, similar to resolvers 24 and 25, in which the rotor 40 is driven by a self-synchronous receiver 41 energized from bus bar 37 and hence rotating in accordance with gyroscope system rotation transmitted by transmitter 11'. This rotation of rotor 40 is modified by the target bearing input $B'r$, received from the bow of the ship, for example, and introduced by hand-crank 42 through differential 43, or it may be introduced automatically. In this way the mechanical input to resolver 39 is target bearing measured from the changing plane of axis 16, 16 rather than solely from the bow of the ship.

The stator winding 44 of resolver 39 is energized from bus bar 36 in accordance with $\sin R' \cdot \cos P'$ voltage, and the other stator winding 45 from bus bar 34 in accordance with $\sin P'$ voltage. The voltage accordingly induced in winding 46 of rotor 40 is impressed on one stator winding 47 of resolver 48, and the voltage induced in rotor winding 49 of resolver 39 is impressed on stator winding 50 of resolver 51. The other stator winding 52' of resolver 48 is energized with $\cos R' \cdot \cos P'$ voltage from bus bar 35.

The respective rotors 53 and 52 of resolvers 48 and 51 are driven by self-deenergizing motors. Referring to resolver 48, its rotor shaft 55 is connected to motor 56 energized through electronic amplifier 57 from null winding 58 of resolver rotor 53. Thus, as motor 56 rotates rotor null winding 58 into non-inductive relation with stator windings 47 and 52', no more current is supplied to motor 56 and it stops after having moved through the proper angle. However, as the field of resolver 48 is continually changing due to the variable stator inputs, motor 56 is usually in continual follow-up motion.

Similarly, the null winding 54 of resolver 51 is rotated in the joint field of stator winding 50 and stator winding 59, energized from rotor winding 49 of resolver 39 and rotor winding 60 of resolver 48, respectively, so that motor 61 connected to its shaft is energized through amplifier 63. Motor 61 thus rotates null winding 54 to non-inductive position, under conditions similar to that described in connection with motor 56.

Output shafts 55 and 62 of calculator 38 accordingly produce, respectively, angles R and P when input crank 42 is set for $B'r=0$, and where R is the roll angle measured about an axis in the deck, and P is the pitch angle measured about an axis in the horizontal. Although the calculator 38 has been illustrated and described sufficiently for an understanding of its construction and operation, further details may be had upon reference to copending application Serial No. 620,595 filed October 5, 1945 by applicant Gittens, issued March 8, 1949 as Patent No. 2,463,687.

The calculator 38 may be employed solely for stabilizing purpose, such as for compass stabilization, simply by setting the target bearing input crank 42 at zero (as illustrated in Fig. 1) in order that the resolvers may develop and apply to output shafts 55 and 62 the angles roll and pitch, i. e., deck tilt athwartship and deck tilt fore and aft. If used permanently for compass stabilization, the self-synchronous receiver 41 may directly drive the rotor 40 of resolver 39 and crank 42 and gearing 43 are eliminated. However, as shown in the drawing, this calculator 38 can be used for any instrument when the hand-crank 42 is used to input the bearing of that instrument.

At 64 a similar calculator is shown, which likewise receives its basic values from the busses 34—37 and gives out deck angles B and C by introduction of the input target bearing angle A by means of hand-crank 65, or automatically. Likewise, 66 designates another similar calculator receiving the basic values from the busses 34—37 and developing angles B' and C' from angle A' entered by hand-crank 67, for example. There may be as many such calculators as desired, suitable amplifiers of sufficient capacity being used to amplify the signals.

Numeral 68 designates a stabilized telescope, shown in skeletal form and modified to utilize the present invention. This modification takes advantage of the fact that the resolvers 48' and 51', corresponding to resolvers 48 and 51, have bearings and are motor driven and may also act as telescope bearings in mounting the observation prism 69. Thus, resolver 48' becomes the mount for the cross-leveling member 70 and applies to it the angle $Z'd$, cross-level about a deck-axis, and the resolver 51' becomes the mounting for the prism 69 applying to it the angle L, level angle measured in the vertical plane through the line of sight to the target. However, since the prism 69 must also be elevated for anti-aircraft work, as is indicated, the angle E, elevation of target above the horizontal, must be superimposed upon the angle L. This is done by rotating the body of the resolver 51 by means of the hand-crank 71 with the worm gearing 72, as shown. Target bearing B′r is introduced by hand-crank 73, marked B′r, and gimbal rotation correction of the same is fed in together with B′r into resolver 39′ by the self-synchronous receiver 41′, which is fed from the gimbal rotation bus bar 37. It will be observed that all moving parts are in the telescope itself.

Guns may also be stabilized by means of this invention, especially guns of the type which are especially fitted for high angle fire on very unstable craft, such as motor torpedo boats and the like. This may be effected simply by replacing prism 69 with a gun barrel and making all parts heavier to withstand gun fire. Ordinary guns may also be corrected for trunnion tilt by obtaining roll and pitch angles, R′ and P′, as illustrated in the diagram of Fig. 2, and combining these angles with target bearing in the horizontal and elevation in the vertical.

Operation of the stabilizing system as a whole will be readily understood from the foregoing description of the operation of the individual units thereof, designated 12, 38, 64, 66 and 68 in Fig. 1, although such units may all have different constructions and functions as indicated. By conducting electrical values equal to the changing trigonometric unstable angle functions from resolvers 24 and 25 and gimbal rotation angle value by means of bus bars 34—37 throughout the ship or other support, these values may be utilized, after conversion in calculators like 38, in accordance with individual orientation of the instruments, into deviation angles in the plane of said orientation and in a plane at an angle thereto, for stabilizing the individual instruments at any location in the ship. Thus, the continuous rotation of resolver 39 by receiver 41, as energized by transmitter 11′ in accordance with the continuous rotation of the stable unit 12, occurs in synchronism with the rotation of resolvers 24 and 25 about axes perpendicular to the deck 10, and "unscrambles" the output of such resolvers 24 and 25, so that the output voltage of winding 49 of the continuously rotated resolver 39 is proportional to sin P and the output voltage of winding 46 of that resolver 39 is proportional to the product of sin R and cos P. It will be seen that voltages proportional only to functions of the angles R and P are supplied to the resolvers 48 and 51, so that motors 56 and 61 drive the rotors 53 and 52 of these resolvers to positions where the respective angles R and P are continuously indicated. Hence the continuous rotation of stable unit 12 is not only compensated for by the calculating mechanism of Fig. 2 but enables accurate transformation of the stabilizing angles in accordance with the orientations of the several remote instruments regardless of their relative orientations with respect to the stable unit 12 and with respect to each other.

Accordingly, the direction of a telescope, gun or other direction indicating or finding device in space may be maintained from a common stable element according to the invention, regardless of the unstable movements of the support and the relative positions of stable element and the different instruments being stabilized. By transmitting the angle functions rather than the angles themselves, the individual calculators for the instruments to be stabilized are rendered much simpler than would be the case if they used the angles directly. Also, greater accuracy results, because of the elimination of steps and consequent sources of error in the conversion.

Although a preferred embodiment of the invention has been illustrated and described herein, it is to be understood that the invention is not limited thereby, but is suscepible of changes in form and detail within the scope of the appended claims.

We claim:

1. In mechanism for stabilizing the position of a member mounted on an unstable support, the combination of a stable element mounted on said support for relative angular deviation movement in at least one plane in response to the unstable movement of said support, means for bodily rotating said element about an axis substantially perpendicular to said support whereby the degree of said angular deviation movement varies, electrical means including rotor and stator windings, several operative connections between said windings and parts of said stabilizing element responsive to said relative movement in said plane, whereby the resulting relative movement between said windings induces in at least one of said windings a voltage proportional to a trigonometric function of the instantaneous angle of said movement, second electrical means energized by said first electrical means and responsive to the bodily rotation of said stable element for developing a corresponding voltage, calculating mechanism energized by the voltages developed by said electrical means to develop a calculated deviation angle value for said member in a plane oriented about an axis substantially parallel to said perpendicular axis with respect to the unstable support, and means energized by said calculating mechanism for stabilizing said member in accordance with said calculated deviation angle.

2. In mechanism for stabilizing the position of a member mounted on an unstable support, the combination of a stable element, a gimbal suspension therefor mounted on said support for relative angular deviation movement in at least one plane in response to the unstable movements of said support, means for bodily rotating said element and its gimbal suspension about an axis substantially perpendicular to said support whereby the degree of said angular deviation movement varies, electrical means including rotor and stator windings, several operative connections between said windings and said gimbal suspension and said stable element responsive to said relative movement in said plane, whereby the resulting relative movement between said windings induces in at least one of said windings a voltage proportional to a trigonometric function of the instantaneous angle of said movement, second electrical means energized by said first electrical means and responsive to the bodily rotation of said stable element and its gimbal suspension for developing a corresponding voltage, calculating mechanism energized by the voltages developed by said electrical means to develop a calculated deviation angle value for said member in a plane oriented about an axis substantially parallel to said perpendicular axis with respect to the unstable support, and means energized by said calculating mechanism for stabilizing said member in accordance with said calculated deviation angle.

3. In mechanism for stabilizing the position of a member mounted on an unstable support, the combination of a stable element, a gimbal suspension therefor mounted on said support for relative angular deviation movement in at least one gimbal trunnion plane in response to the unstable movements of said support, means for bodily rotating said element and its gimbal suspension about an axis substantially perpendicular to said support whereby the degree of said angular deviation movement varies, electrical means including rotor and stator windings, several operative connections between said windings and relatively movable gimbal trunnion parts responsive to said relative movement between said gimbal trunnion parts in said plane, whereby the resulting relative movement between said windings induces in at least one of said windings a voltage proportional to a trigonometric function of the instantaneous angle of said movement, second electrical means energized by said first electrical means and responsive to the bodily rotation of said stable element and its gimbal suspension for developing a corresponding voltage, calculating mechanism energized by the voltages developed by said electrical means to develop a calculated deviation angle value for said member in a plane oriented about an axis substantially parallel to sid perpendicular axis with respect to the unstable support, and means energized by said calculating mechanism for stabilizing said member in accordance with said calculated deviation angle.

4. In mechanism for stabilizing the position of a member mounted on an unstable support, the combination of a stable element, a gimbal suspension therefor mounted on said support for relative angular deviation movement in the planes of the trunnions of said gimbal suspension in response to the unstable movements of said support, means for bodily rotating said element and its gimbal suspension about an axis substantially perpendicular to said support whereby the degree of said angular deviation movement varies in each of said planes, electrical means including rotor and stator windings located at said gimbal trunnions, several operative connections between relatively movable parts of the corresponding trunnions and responsive to said relative movement between the corresponding gimbal trunnion parts in said corresponding planes, whereby the resulting relative movements between said windings induces in at least one of the windings of each pair voltages proportional to a trigonometric function of the corresponding instantaoneous angles of said movement, second electrical means energized by said first electrical means and responsive to the bodily rotation of said stable element and its gimbal suspension for developing a corresponding voltage, calculating mechanism energized by the voltages developed by said electrical means to develop calculated deviation angle values for said member in mutually perpendicular planes, and means energized by said calculating mechanism for stabilizing said member in said mutually perpendicular planes in accordance with the corresponding calculated deviation angles.

5. In mechanism for stabilizing the position of a member mounted on an unstable support, the combination of a stable element mounted on said support for relative angular deviation movement in at least one plane in response to the unstable movements of said support, means for bodily rotating said element about an axis substantially perpendicular to said support whereby the degree of said angular deviation movement varies, electrical means including rotor and stator windings, several operative connections between said windings and parts of said stable element responsive to said relative movement in said plane, whereby said relative movement between said windings induces in at least one of said windings a voltage proportional to a trigonometric function of the instantaneous angle of said movement, second electrical means energized by said first electrical means and responsive to the bodily rotation of said stable element for developing a corresponding voltage, calculating mechanism energized by the voltages developed by said electrical means to develop a calculated deviation angle value for said member in a plane oriented about an axis substantially parallel to said perpendicular axis with respect to the unstable support, means for orienting said member, operative connections between said last-named means and said calculating mechanism for modifying the output of the latter, and means energized by said calculating mechanism for stabilizing said member in accordance with said calculated deviation angle.

6. In mechanism for stabilizing the positions of a plurality of members mounted on an unstable suport, the combination of a stable element mounted on said support for relative angular deviation movement in at least one plane in response to the unstable movements of said support, means for bodily rotating said element about an axis substantially perpendicular to said support whereby the degree of said angular deviation movement varies, electrical means including rotor and stator windings, several operative connections between said windings and parts of said stable element responsive to said relative movement in said plane, whereby said relative movement between said windings induces in at least one of said windings a voltage proportional to the trigonometric function of the instantaneous angle of said movement, means for independently orienting each of said members, second electrical means energized by said first electrical means and responsive to the bodily rotation of said stable element for developing a corresponding voltage, calculating mechanism for each of said members energized by the voltages developed by said electrical means, said calculating mechanism being responsive to the orientation of the members to develop a calculated deviation angle value for each of said members in a plane oriented about an axis substantially parallel to said perpendicular axis with respect to the unstable support, and means energized by said calculating mechanism for stabilizing each of said members in accordance with said calculated deviation angle.

7. In mechanism for stabilizing the positions of a plurality of members mounted on an unstable suport, the combination of a stable element, a gimbal suspension therefor mounted on said support for relative angular deviation movement in at least one plane in response to the unstable movements of said support, means for bodily rotating said element and its gimbal suspension about an axis substantially perpendicular to said support whereby the degree of said angular deviation movement varies, electrical means including rotor and stator windings, several operative connections between said windings and said gimbal suspension and said stable element responsive to said relative movement in said plane, whereby the resulting relative movement between said windings induces in at least one of said windings a voltage proportional to a trigonometric function of the instantaneous angle of said movement, means for independently orienting each of said members, second electrical means energized by said first electrical means and responsive to the bodily rotation of said stable element and its gimbal suspension for developing a corresponding voltage, calculating mechanism energized by the voltages developed by said electrical means, said calculating mechanism being responsive to orientation of said members to develop a calculated deviation angle value for each of said members in a plane oriented about an axis substantially parallel to said perpendicular axis with respect to the unstable support, and means energized by said calculating mechanism for stabilizing each of said members in accordance with said calculated deviation angle.

8. In mechanism for stabilizing the positions of a plurality of members mounted on an unstable support, the combination of a stable element, a gimbal suspension mounted on said support for relative angular deviation movement in at least one gimbal trunnion plane in response to the unstable movements of said support, means for bodily rotating said element and its gimbal suspension about an axis substantially perpendicular to said support whereby the degree of said angular deviation movement varies, electrical means including rotor and stator windings, several operative connections between said windings and said gimbal suspension and said stable element responsive to said relative movement between said gimbal trunnion parts in said plane, whereby the resulting relative movement between said windings induces in at least one of said windings a voltage proportional to a trigonometric function of the instantaneous angle of said movement, means for independently orienting each of said members, second electrical means energized by said first electrical means and responsive to the bodily rotation of said stable element and its gimbal suspension for developing a corresponding voltage, calculating mechanism energized by the voltages developed by said electrical means, said mechanism being responsive to orientation of said members to develop a calculated deviation angle value for said members in a plane oriented about an axis substantially parallel to said perpendicular axis with respect to the unstable support, and means energized by said calculating mechanism for stabilizing each of said members in said lastnamed plane in accordance with said calculated deviation angle.

9. In mechanism for stabilizing the positions of a plurality of members mounted on an unstable support, the combination of a stable element mounted on said support for relative angular deviation movement in the planes of the trunnions of said gimbal suspension in response to the unstable movements of said support, means for bodily rotating said element about an axis substantially perpendicular to said support whereby the degree of said angular deviation movement varies in each of said planes, electrical means including a set of rotor and stator windings located at each of said gimbal trunnions and responsive to said relative movement between said gimbal trunnion parts in said corresponding planes, whereby the resulting relative movement between the windings of each of said sets induces in at least one winding of both sets voltages proportional to trigonometric function of the instantaneous angles of said movement, means for independenty orienting each of said members, second electrical means energized by said first electrical means and responsive to the bodily rotation of said stable element for developing a corresponding voltage, calculating mechanism energized by the voltages developed by said electrical means, said mechanism being responsive to the angle of orientation of said members to develop calculated deviation angle values for each of said members about mutually perpendicular oriented axes corresponding substantially to one instantaneous angle of orientation of said rotating gimbal trunnion axes, and means energized by said calculating mechanism for stabilizing each of said members about its said axes in accordance with the corresponding calculated deviation angles.

10. In mechanism for stabilizing the positions of a plurality of members mounted on an unstable support, the combination of a stable element mounted on said support for relative angular deviation movement about at least one axis in response to the unstable movements of said support, means for continuously rotating said element about an axis substantially perpendicular to said support whereby the degree of said angular deviation movement about said first axis varies, electrical means including rotor and stator windings, several operative connections between said windings and relatively movable parts of said stable element responsive to said relative movement in said plane, whereby the resulting relative movement between said windings induces in at least one of said windings a voltage proportional to the trigonometric function of the instantaneous angle of said movement, second electrical means energized by said first electrical means and responsive to the continuous rotation of said stable element for developing a corresponding voltage, calculating mechanism for each of said members energized jointly by said electrical means to develop a calculated deviation angle value for each of said members in a plane oriented about an axis substantially parallel to said perpendicular axis with respect to the unstable support, means for independently orienting each of said members, and means energized by each of said calculating mechanisms for stabilizing the corresponding member in accordance with said calculated deviation angle developed thereby.

11. In mechanism for stabilizing the position of a member mounted on an unstable support, the combination of a stable element mounted on said support for relative angular deviation movement in at least one plane in response to the unstable movements of said support, means for continuously rotating said element about an axis substantially perpendicular to said support whereby the degree of said angular deviation movement varies, electrical means including rotor and stator windings, several operative connections between said windings and relatively movable parts of such stable element responsive to said relative movement in said plane, whereby the resulting relative movement between said windings induces in at least one of said windings a voltage proportional to a trigonometric function of the instantaneous angle of said movement, electrical induction means having inductively-coupled stator and rotor windings, electrical connections between said electrical means and said stator winding for energizing the same, operative connections between said rotating means and said rotor winding for continuously rotating the same, electrical motive means responsive to voltages induced in said rotor winding and in said electrical means, and operative connections between said motive means and said member for stabilizing the same.

12. In mechanism for stabilizing the position of a member mounted on an unstable support, the combination of a stable element mounted on said support for relative angular deviation movement in at least one plane in response to the unstable movements of said support, means for continuously rotating said element about an axis substantially perpendicular to said support whereby the degree of said angular deviation movement varies, electrical means including rotor and stator windings, several operative connections between said windings and relatively movable parts of such stable element responsive to said relative movement in said plane, whereby the resulting relative movement between said windings induces in at least one of the windings a voltage proportional to a trigonometric function of the instantaneous angle of said movement, electrical induction means having inductively-coupled stator and rotor windings, electrical connections between said electrical means and said stator winding for energizing the same, operative connections between said continuously rotating means and said rotor winding for rotating the same, electrical motive means responsive to voltages induced in said rotor winding and in said electrical means, means for orienting said member, means actuated by said orienting means for modifying the output of said motive means, and operative connections between said motive means and said member for stabilizing the same.

13. In mechanism for stabilizing the position of a member mounted on an unstable support, the combination of a stable element, a gimbal suspension therefor mounted on said support for relative angular deviation movement in the planes of said gimbal trunnions in response to the unstable movements of said support, means for continuously rotating said element about an axis substantially perpendicular to said support whereby the degree of said angular deviation movement varies, electrical means including rotor and stator windings, several operative connections between said windings and relatively movable parts of said gimbal trunnions responsive to said relative movement between said gimbal trunnion parts in said planes, whereby the resulting relative movement between the windings of each set induces in at least one winding of said sets voltages proportional to a trigonometric function of the corresponding instantaneous angles of said movement, electrical induction means having stator windings energized by said electrical means and an inductively-coupled rotor winding, operative connections between said rotating means and said rotor winding for continuously rotating the same, electrical motive means responsive to voltages induced in said rotor winding and in said electrical means, and operative connections between said motive means and said member for stabilizing the same.

14. In mechanism for stabilizing the position of a member mounted on an unstable support, the combination of a stable element, a gimbal suspension therefor mounted on said support for relative angular deviation movement in the planes of said gimbal trunnions in response to the unstable movements of said support, means for continuously rotating said element about an axis substantially perpendicular to said support whereby the degree of said angular deviation movement varies, electrical means including rotor and stator windings, several operative connections between said windings and relatively movable parts of said gimbal trunnions responsive to said relative movement between said gimbal trunnion parts in said planes, whereby the resulting relative movement between the windings of each set induces in at least one winding of said sets voltages proportional to a trigonometric function of the corresponding instantaneous angles of said movement, electrical induction means having stator windings energized by said electrical means and an inductively-coupled rotor winding, operative connections between said rotating means and said rotor winding for continuously rotating the same, electrical motive means responsive to voltages induced in said rotor winding and in said electrical means, means for orienting said member, means actuated by said orienting means for modifying the output of said motive means, and operative connections between said motive means and said member for stabilizing the same.

15. In mechanism for stabilizing the position of a member mounted on an unstable support, the combination of a stable element, a gimbal suspension therefor mounted on said support for relative angular deviation movement in the planes of said gimbal trunnions in response to the unstable movement of said support, means for continuously rotating said element about an axis substantially perpendicular to said support, whereby the degree of said angular deviation movement varies, electrical means including rotor and stator windings, several operative connections between said windings and relatively movable parts of said gimbal trunnions responsive to said relative movement between said gimbal trunnion parts in said planes, whereby the resulting relative movement between the windings of each set induces in at least one winding of said sets voltages proportional to a trigonometric function of the corresponding instantaneous angles of said movement, electrical induction means having stator windings energized by said electrical means and an inductively-coupled rotor winding, operative connections between said rotating means and said rotor winding for continuously rotating the same, second electrical induction means having stator windings energized by said electrical means and the voltage induced in said rotor winding, a second rotor having a winding inductively coupled to said second stator windings, motive means energized by the voltage induced in said second rotor winding, and operative connections between said motive means and said member for stabilizing the same.

16. In mechanism for stabilizing the position of a member mounted on an unstable support, the combination of a stable element, a gimbal suspension therefor mounted on said support for relative angular deviation movement in the planes of said gimbal trunnions in response to the unstable movement of said support, means for continuously rotating said element about an axis substantially perpendicular to said support, whereby the degree of said angular deviation movement varies, electrical means including rotor and stator windings, several operative connections between said windings and relatively movable parts of said gimbal trunnions responsive to said relative movement between said gimbal trunnion parts in said planes, whereby the resulting relative movement between the windings of each set induces in at least one winding of said sets voltages proportional to a trigonometric function of the corresponding instantaneous angles of said movement, electrical induction means having stator windings energized by said electrical means and an inductively-coupled rotor winding, operative connections between said rotating means and said rotor winding for continuously rotating the same, second electrical induction means having stator windings energized by said electrical means and the voltage induced in said rotor winding, a second rotor having a winding inductively coupled to said second stator windings, motive means energized by the voltage induced in said second rotor winding, third electrical induction means having stator windings energized by the voltages induced in said first and second rotor windings, a third rotor having a winding inductively coupled to said third stator winding, second motive means energized by the voltage induced in said third rotor winding, and operative connections between each of said motive means and said member for stabilizing the latter in two corresponding planes.

17. In mechanism for stabilizing the position of a member mounted on an unstable support, the combination of a stable element, a gimbal suspension therefor mounted on said support for relative angular deviation movement in the planes of said gimbal trunnions in response to the unstable movement of said support, means for continuously rotating said element about an axis substantially perpendicular to said support, whereby the degree of said angular deviation movement varies, electrical means including rotor and stator windings, several operative connections between said windings and relatively movable parts of said gimbal trunnions responsive to said relative movement between said gimbal trunnion parts in said planes, whereby the resulting relative movement between the windings of each set induces in at least one winding of said sets voltages proportional to a trigonometric function of the corresponding instantaneous angles of said movement, electrical induction means having stator windings energized by said electrical means and an inductively-coupled rotor winding, operative connections between said rotating means and said rotor winding for continuously rotating the same, second electrical induction means having stator windings energized by said electrical means and the voltage induced in said rotor winding, a second rotor having a winding inductively coupled to said second stator windings, motive means energized by the voltage induced in said second rotor winding, means for orienting said member, means actuated by said orienting means for modifying the output of said motive means, and operative connections between said motive means and said member for stabilizing the same.

18. In mechanism for stabilizing the position of a member mounted on an unstable support, the combination of a stable element, a gimbal suspension therefor mounted on said support for relative angular deviation movement in the planes of said gimbal trunnions in response to the unstable movement of said support, means for continuously rotating said element about an axis substantially perpendicular to said support, whereby the degree of said angular deviation movement varies, electrical means including rotor and stator windings, several operative connections between said windings and relatively movable parts of said gimbal trunnions responsive to said relative movement between said gimbal trunnion parts in said planes, whereby the resulting relative movement between the windings of each set induces in at least one winding of said sets voltages proportional to a trigonometric function of the corresponding instantaneous angles of said movement, electrical induction means having stator windings energized by said electrical means and an inductively-coupled rotor winding, operative connections between said rotating means and said rotor winding for continuously rotating the same, second electrical induction means having stator windings energized by said electrical means and the voltage induced in said rotor winding, a second rotor having a winding inductively coupled to said second stator windings, motive means energized by the voltage induced in said second rotor winding, third electrical induction means having stator windings energized by the voltages induced in said first and second rotor windings, a third rotor having a winding inductively coupled to said third stator windings, second motive means energized by the voltage induced in said third rotor winding, means for orienting said member, means actuated by said orienting means for modifying the output of both of said motive means, and operative connections between each of said motive means and said member for stabilizing the latter in two corresponding planes.

GEORGE AGINS.
EDMUND D. GITTENS.

REFERENCES CITED

The following references are of record in the file of this patent:

UNITED STATES PATENTS

| Number | Name | Date |
| --- | --- | --- |
| 1,583,439 | Barr et al. | May 4, 1926 |
| 1,733,531 | Dugan | Oct. 29, 1929 |
| 2,339,508 | Newell | Jan. 18, 1944 |
| 2,433,837 | Dawson | Jan. 6, 1948 |